June 22, 1965          E. SMITH ETAL          3,190,476

LINE OR PIPE DETECTOR FOR EARTH MOVING MACHINERY

Filed July 8, 1963          3 Sheets-Sheet 1

INVENTORS
Earl Smith &
William R. Sherman, Jr.

BY *Mawhinney & Mawhinney*
ATTORNEYS

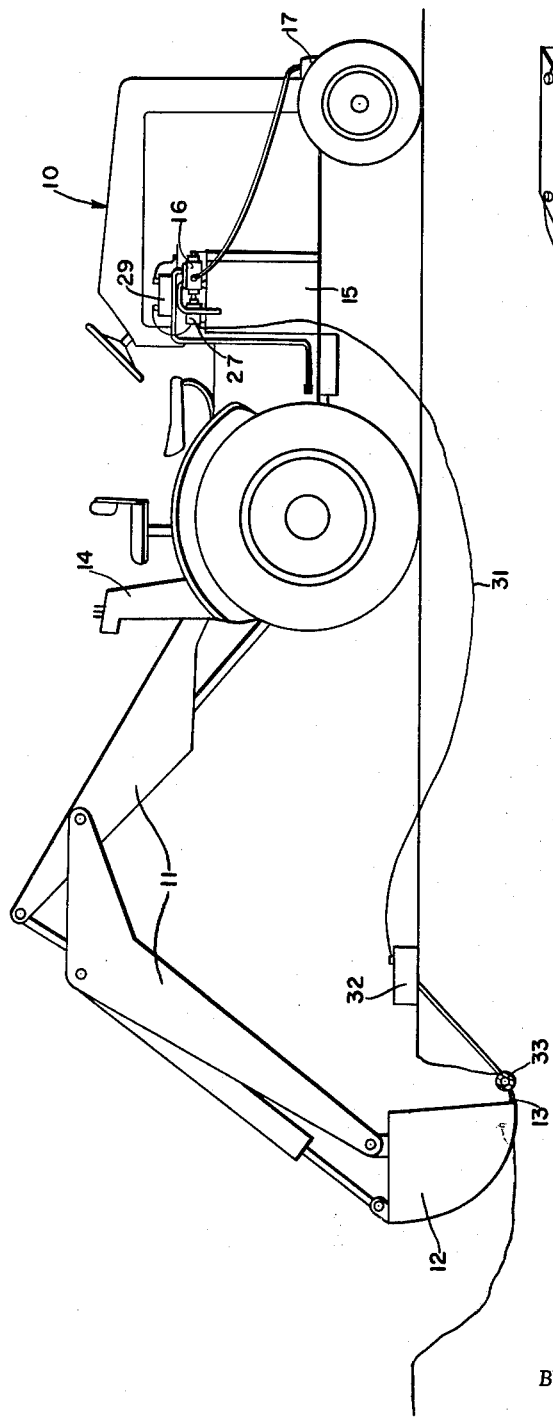
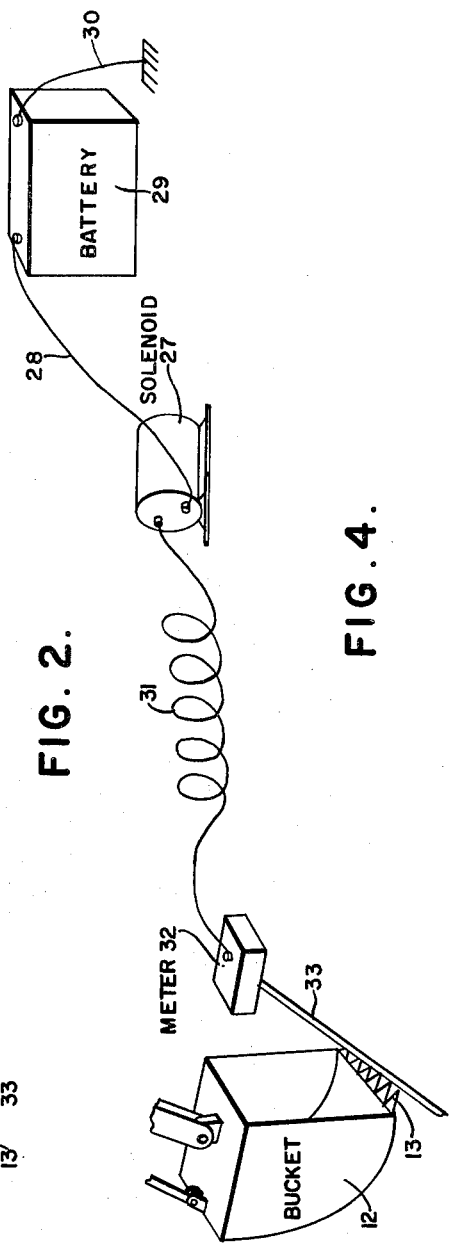
FIG. 2.
FIG. 4.
INVENTORS
Earl Smith &
William R. Sherman, Jr.
BY Mawhinney & Mawhinney
ATTORNEYS

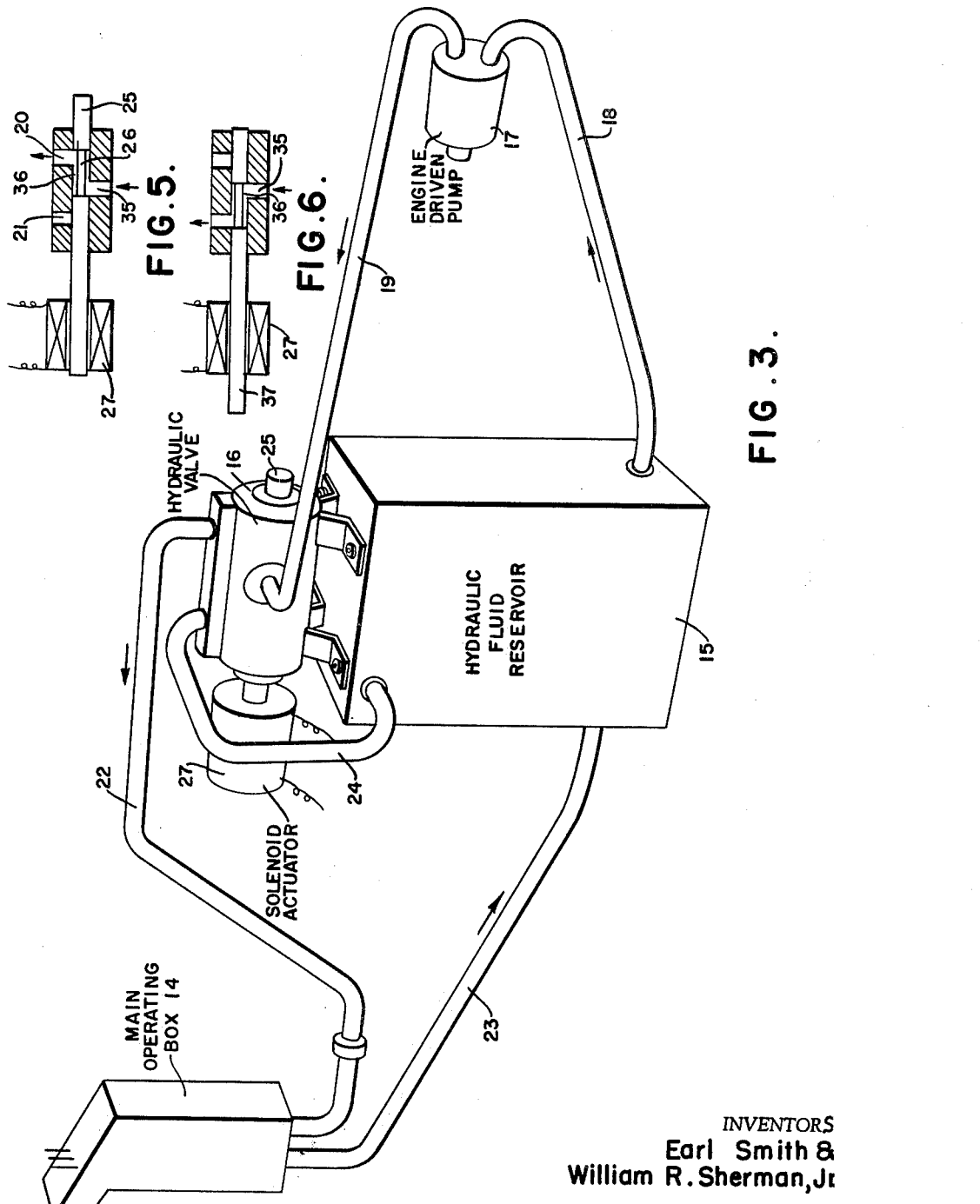

United States Patent Office 3,190,476
Patented June 22, 1965

3,190,476
LINE OR PIPE DETECTOR FOR EARTH MOVING MACHINERY
Earl Smith, 117 N. 13th St., Arkadelphia, Ark., and William R. Sherman, Jr., 801 N. Jefferson, Magnolia, Ark.
Filed July 8, 1963, Ser. No. 293,320
3 Claims. (Cl. 214—138)

The present invention relates to line or pipe detector for earth moving machinery, and more particularly to a detector for sub-surface pipe lines or the like which also acts in the capacity of a deactivator for the earth working machinery to the end that sub-surface pipe lines will not be damaged by the earth working implement.

Another object of the invention is to provide, in connection with the hydraulic system installed on the tractor or other self-propelled vehicle supporting the earth working machinery, a sensing electrical system superimposed upon the electric system of the vehicle which, at contact of the earth working implement with a sub-surface pipe line, will actuate a hydraulic valve to close off the supply of hydraulic fluid under pressure to the main operating box of the hydraulic operating system and recycle the pumped fluid to the hydraulic liquid reservoir.

A further object of the invention is to reduce the cost of ditching in proportion to the elimination of damage to sub-surface pipe lines or other sub-surface objects and also to reduce damage to earth working equipment consequent upon impact with pipe lines or the like.

It is a still further object of the invention to provide a detector and deactivator which will automatically arrest the operation of the earth working implement without regard to the operator of the machine and much more quickly than can be done by the operator and, as a matter of fact, the device is so sensitive that deactivation will occur before the operator can feel that he has touched the line.

The invention is applicable to any species of digging equipment, such as backhoe, rotary digger, buckets, etc. As representative of any earth working implement it will simplify the description to refer to the same as a bucket.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 2 is a side elevational view of the same, illustrating the earth working implement in contact with a sub-surface pipe line.

FIGURE 3 is a perspective view of a form of hydraulic system for operating the earth working implement.

FIGURE 4 is a diagrammatic view of the electric circuit system for detecting the sub-surface pipe and deactivating the earth working machine.

FIGURE 5 is a cross-sectional view through a form of hydraulic valve employed with solenoid operation showing the valve in power supply position.

FIGURE 6 is a similar view showing the valve in deactivated hydraulic fluid recycling position.

Figure 1:
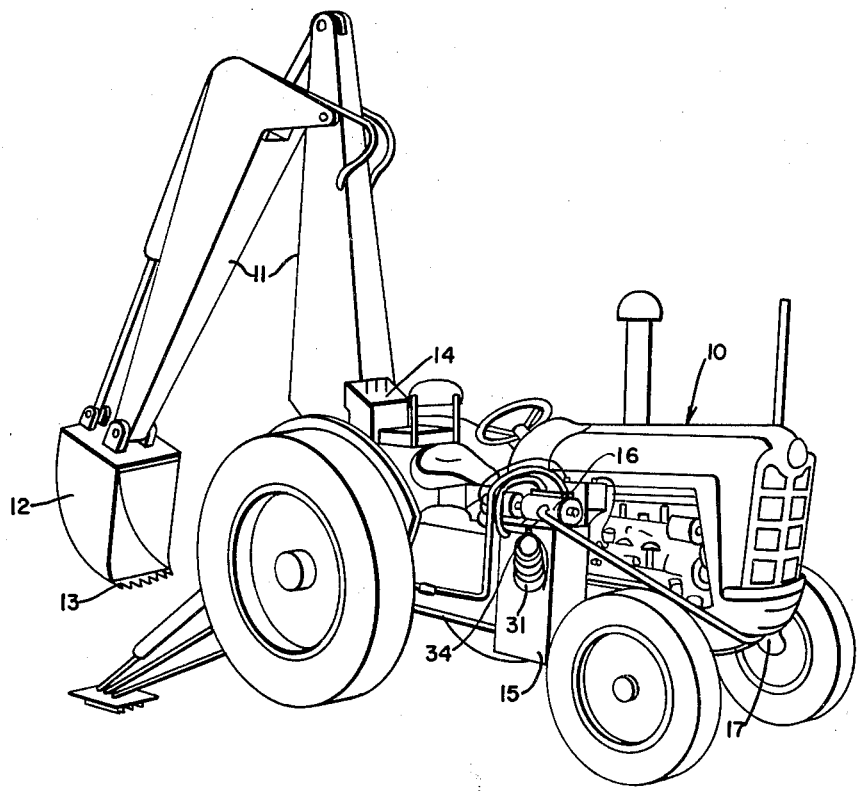
FIGURE 1 is a perspective view of a combined tractor and earth working machine equipped with a line detector and deactivator according to the present invention.

Referring more particularly to the drawings, 10 designates a tractor or other self-propelled vehicle which supports and transports earth working apparatus 11 of any particular type including a bucket 12 being representative of any type of earth working implement. The bucket is shown to have forwardly projecting teeth 13.

The earth working apparatus also includes a main operating box 14 installed at an appropriate point on the vehicle, this main operating box 14 being connected in well known manner with the earth working apparatus 11 for the actuation of the bucket or other implement 12 in an earth excavating or other operation.

The main operating box 14 is connected with a hydraulic operating system of which 15 represents a hydraulic fluid reservoir, 16 a two-position hydraulic valve, and 17 a pump driven by the engine of the vehicle 10.

A suction pipe 18 connects the lower portion of the reservoir 15 with the intake of the pump 17, while 19 designates the fluid delivery pipe from the pump 17 to the valve chamber 36 of the hydraulic valve 16, the fluid entering through an induction port 35 as illustrated in FIGURES 5 and 6.

As also shown in FIGURES 5 and 6, the valve casing contains ports 20 and 21 spaced along its length; the port 20 connects with a pressure delivery pipe 22 from the valve to the main operating box 14.

A return pipe 23 extends from the main operating box 14 to a low level of the reservoir 15.

A recycling pipe connects with the valve return port 21 and leads to an upper level of the hydraulic fluid reservoir 15.

A reciprocating valve member 25 is mounted through the valve casing 16 and has at an intermediate portion a cutaway portion 26 adapted in both positions of FIGURES 5 and 6 to register with the induction port 35 and selectively with the pressure delivery port 20 and the return port 21.

The movable or reciprocating valve member 25 connects with the core 37 of a solenoid 27 by which the valve member 25 may be shifted from the operating position of FIGURE 5 to the recycling position of FIGURE 6 incident to electrical excitation for which the solenoid coil 27 is included in a circuit, shown in FIGURE 4, deriving its voltage from the vehicle battery 29 as a convenient source of power.

A lead 28 is shown as connecting the positive pole of the battery with the similar terminal of the solenoid 27. The negative pole of the battery is grounded conventionally as at 30 in FIGURE 4 to the frame of the vehicle 10. The other terminal of the solenoid 27 is connected to a lead 31 which normally reposes on a hook 34 or other support on the vehicle in a coiled condition, as indicated in FIGURE 1.

As appears in FIGURES 2 and 4, the bucket 12, which is also electrically grounded on the frame of the vehicle, is shown in the act while making an excavation in which a water or fuel line or pipe 33 has been uncovered and contacted by the teeth 13 of the bucket 12, which pipe line 33 is electrically connected in a conventional manner to a meter 32 or other metallic object at or above surface level to which the free end of the lead 31 is electrically connected, as seen in FIGURE 4.

In the use of the device, in the raised position of the bucket 12, the vehicle will proceed to an excavation site whereupon the vehicle will be stopped and secured against motion by braking and/or blocking. The pump 17 may be then put into operation while the vehicle engine is still running and the operation of the excavating apparatus 11, 12 is begun by shifting the valve member 25 to the position of FIGURE 5. In this position the pump 17 withdraws hydraulic fluid from a low portion of the reservoir 15 through the pipe 18 and discharges it under pressure through the pipe 19 to the port 35 of the hydraulic control valve.

When the valve member 25 is in the position of FIGURE 5 to which it may be moved manually or otherwise, the pressurized fluid in the valve chamber 36 will be delivered through port 20 and pipe or hose 22 to the main operating box 14 for the continuous actuation of the earth working apparatus 11 and its bucket or implement 12 by which earth may be dredged up and a ditching operation performed.

As the pressurized fluid is exhausted from the box 14 it is returned by the pipe 23 to the reservoir 15.

Before any ditching operation is begun as thus described, the coiled lead 31 is removed from its support 34 on the vehicle and drawn out to the requisite length where its free end is electrically connected to the meter box 32 or other above-surface electric conductor which is in contact with the sub-surface pipe line 33. The circuit is, therefore, normally open between the bucket 12 or its teeth 13 and the sub-surface pipe 33, and such circuit will remain open unless and until the teeth 13 make electrical contact with the submerged pipe line 23, at which time the circuit is established through the solenoid 27 in a direction to cause the core 37 to be shifted to the left viewed comparatively in FIGURES 5 and 6 which has the effect to close off communication of port 20 with induction port 35, thus immediately arresting all motion of the apparatus 11 including its implement 12.

At the same time the pumped hydraulic fluid is discharged through the port 21 into the return pipe 24 whereby a closed circuit is established between the pump 17, hydraulic valve 16 and the reservoir 15, thus not interfering with the continuous operation of the pump 17 which is or may be controlled by engine operation.

It will be understood that the solenoid is wired to the battery of the tractor on the positive side and is so insulated that it is not grounded to the machine frame. The wire or lead 31 is connected to the negative side of the solenoid and to the water meter, gas meter or other conductor connecting with the pipe line.

The actuation of the solenoid results in a substantially instantaneous deactivation of the hydraulic system operating the earth working machine. Accordingly, this action stops the implement before it can break or damage the pipe line. Therefore, the use of the invention will greatly reduce the cost of ditching.

Although we have disclosed herein the best forms of the invention known to us at this time, we reserve the right to all such modifications and changes as may come within the scope of the following claims.

What is claimed is:

1. For use with a sub-surface pipe line of electrically conducting material and a surface meter in electrically conducting relation to the pipe line, an engine-propelled earth working machine carrying an electrical system for the vehicle including a direct current battery, a reservoir for hydraulic fluid and a hydraulically operated earth working implement movable relatively to the machine and controlled by an operating box on the vehicle, a pipe line detector and implement deactivator comprising
    (a) an engine-driven pump,
    (b) a supply line from the reservoir to the pump,
    (c) a hydraulic valve,
    (d) a pipe line from the pump to the valve, said valve having
    (e) selective means for supplying the pumped hydraulic fluid under pressure to the operating box and for recycling the pumped fluid from the valve back to the reservoir,
    (f) a solenoid connected to operate the valve having
    (g) one terminal connected to the said battery, and
    (h) an electrical lead from the other terminal of the solenoid adapted to be applied to the surface meter,
    (i) so that when the earth working implement contacts the sub-surface pipe line circuit will be closed through electrically conductive sub-surface pipe line, meter, solenoid and battery for shifting the valve from a position establishing hydraulic fluid connection between the pump and operating box to a closed hydraulic circuit connection between the pump and reservoir for deactivating the implement and recycling the fluid to the reservoir.

2. For use with a sub-surface pipe line of electrically conducting material and a surface meter in electrically conducting relation to the pipe line, an engine-propelled earth working machine carrying an electrical system for the vehicle including a direct current battery, a reservoir for hydraulic fluid and a hydraulically operated earth working implement movable relatively to the machine and controlled by an operating box on the vehicle, a pipe line detector and implement deactivator comprising
    (a) an engine-driven pump,
    (b) a supply line from the low point in the hydraulic fluid reservoir to the intake of the pump,
    (c) a hydraulic valve having an inlet port and two separate, spaced discharge ports,
    (d) a fluid delivery pipe line from the output of the pump to the inlet port of the valve,
    (e) a pressure delivery pipe line from one of the discharge ports of the valve to the operating box,
    (f) a return pipe line from the operating box to the reservoir,
    (g) a recycling pipe line from the other discharge port of the valve to the reservoir,
    (h) a solenoid having one terminal connected to the battery,
    (i) a reciprocating core through the solenoid,
    (j) a reciprocating valve member in the valve connected to be moved by said core and having
    (k) a cut-away portion adapted in two positions to register with the inlet port and one or other of the discharge ports, and
    (l) an elongated lead from the other terminal of the solenoid adapted to be applied to the surface meter,
    (m) so that when the earth working implement contacts the sub-surface pipe line circuit will be closed through electrically conductive sub-surface pipe line, meter, solenoid and battery for shifting the solenoid core and entrained reciprocating valve member from a position establishing hydraulic fluid connection between the pump and operating box to a closed hydraulic connection between the pump and reservoir for deactivating the implement and recycling the fluid to the reservoir.

3. A pipe line detector and implement deactivator as claimed in claim 2 in which the core is adapted in one position of the valve to project outwardly of the solenoid and the reciprocating valve member in the other position of the valve is adapted to project beyond such valve for manual shifting operation to reset the valve to a desired position.

References Cited by the Examiner

UNITED STATES PATENTS

| | | | |
|---|---|---|---|
| 1,850,412 | 3/32 | Pavlik | 37—86 |
| 2,409,397 | 10/46 | Shaehan et al. | 173—2 |
| 2,561,152 | 7/51 | Stryker | 340—213 |

HUGO O. SCHULZ, *Primary Examiner.*